3,408,242
PROCESS AND APPARATUS FOR WELDING
LAYERS OF THERMOPLASTIC MATERIAL
Kurt Rochla, Lengerich, Germany, assignor to
Windmoller & Holscher
Filed Mar. 11, 1964, Ser. No. 351,098
Claims priority, application Germany, Mar. 19, 1963,
W 34,127
17 Claims. (Cl. 156—274)

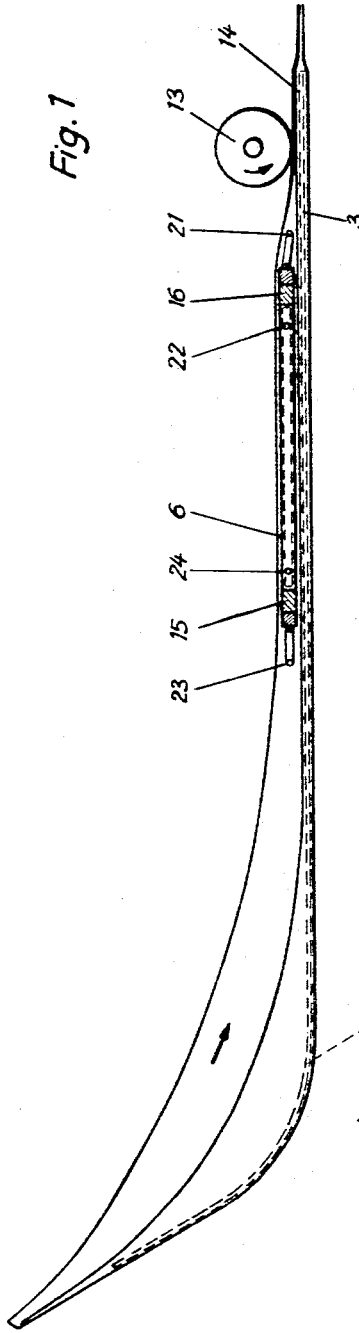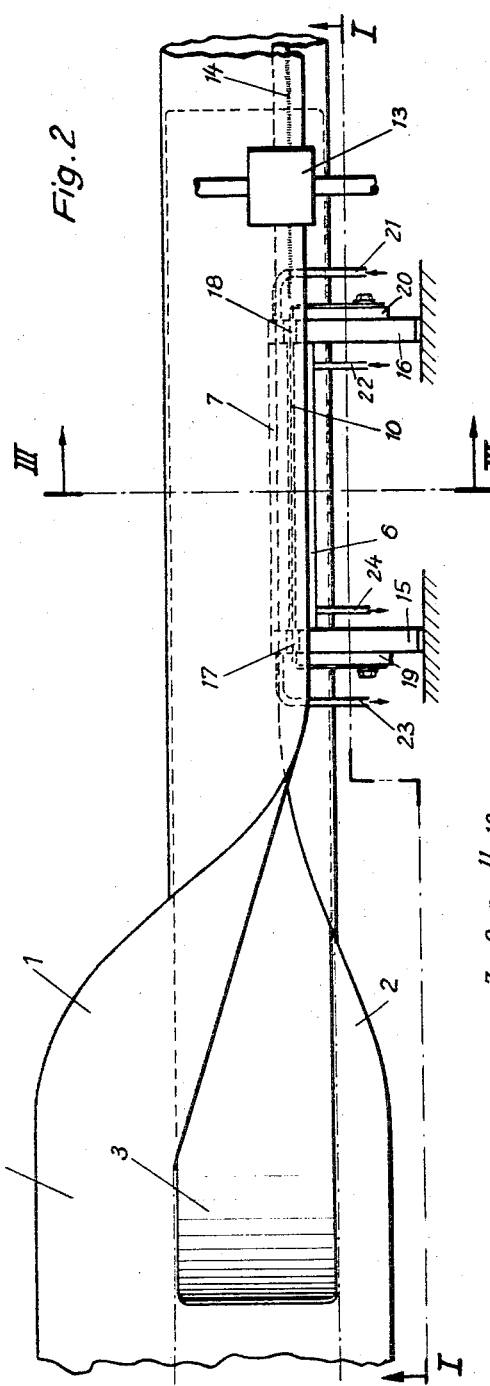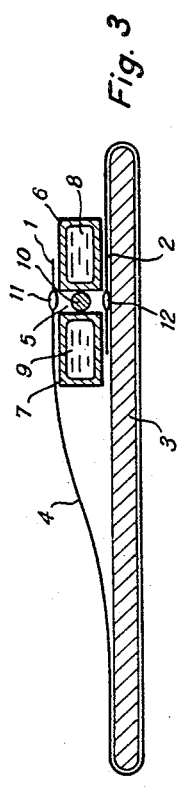

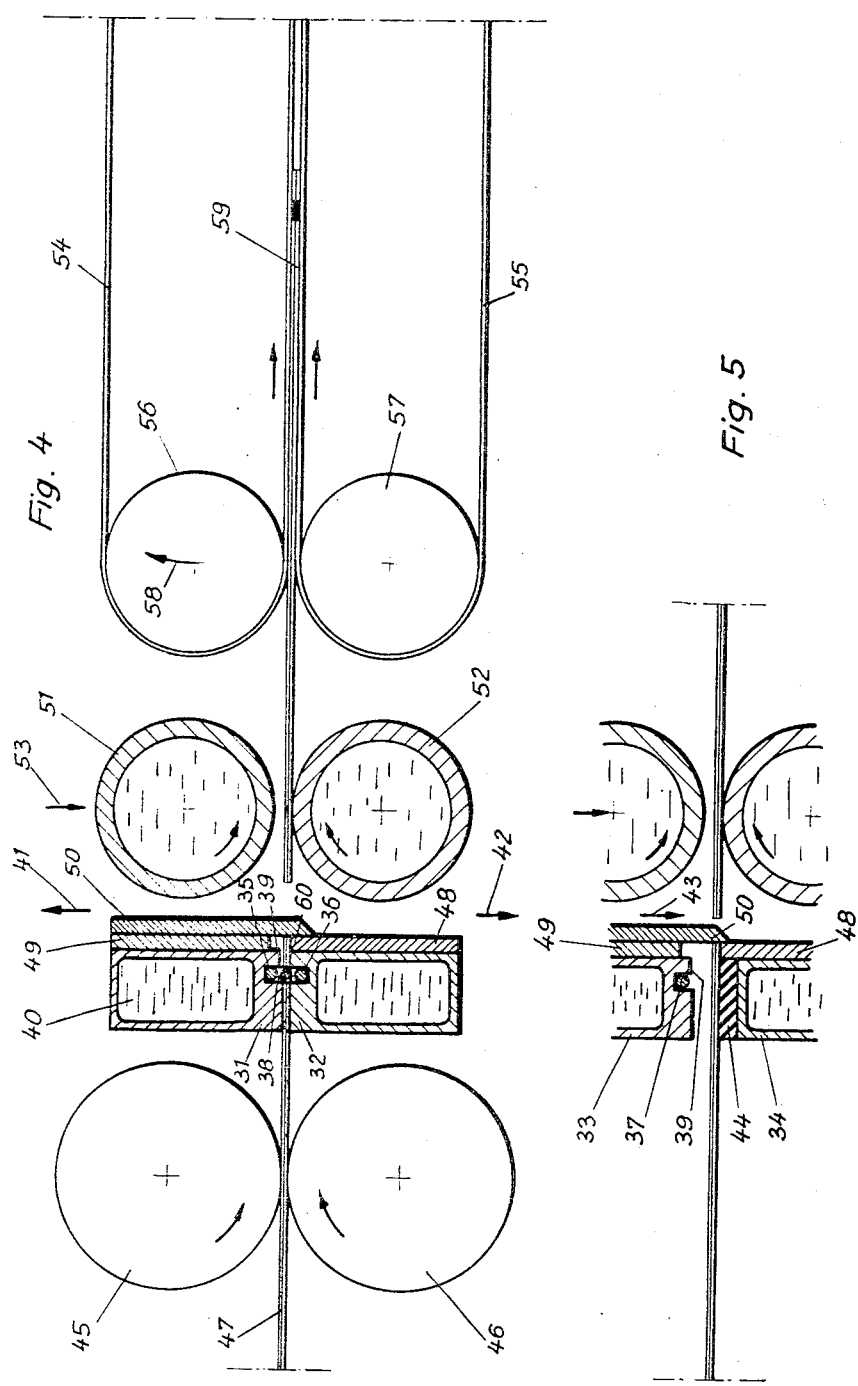

ABSTRACT OF THE DISCLOSURE

A process and apparatus for welding thermoplastic layers along a seam consisting of heating the layers of the material to a temperature above their melting point by radiant heat supplied at right angles to the plane of the material in the region in which the seam weld is to be formed, and subjecting the superimposed layers to a consolidating pressure in this region. The consolidating pressure is produced by at least one pressing roll arrangement located behind the heating station. At the heating station, an elongated heater is maintained spaced from the thermoplastic layers by means of elongated spacer members, with the heating element radiating heat to the thermoplastic layers at generally right angles thereto without engaging same.

---

Seam welds for joining superimposed layers of thermoplastic material are always made by a contact process if the layers of material extend toward both sides from the seam weld, so that the latter is not directly disposed at the edges. This process is particularly used for making longitudinal tube seams and of flush transverse seams in the manufacture of sacks and bags from plastics. A permanently heated welding tool or a pulse-heated welding strip is used in the contact process. To prevent an adherence of the liquid plastic, these tools are coated with an anti-blocking agent, preferably with Teflon (registered trademark, polytetrafluoroethylene), which has been reinforced with glass filaments. This Teflon reinforced with glass filaments has various, important disadvantages. The welding temperature is limited by the combustion temperature of the Teflon reinforced with glass filaments. On the other hand, Teflon reinforced with glass filaments forms a heat insulation. Hence, the welding time must be relatively long because the welding heat must be supplied with a limited temperature gradient and through a heat insulating layer. Another disadvantage of the supply of the welding heat by contact action resides in that a shrinkage of the seam is prevented although a shrinkage is desirable for achieving a seam of optimum strength.

In a process of welding layers of thermoplastic material, which layers extend toward both sides from the seam weld, particularly for forming longitudinal and transverse seams in the manufacture of sacks and bags of plastics, these disadvantages are avoided according to the invention in that the layers of material are heated to a temperature above their melting point by radiant heat supplied at right angles to the plane of the material in the region in which the seam weld is to be formed, and that the superimposed layers are then subjected to a consolidating pressure in this region. For making end seams, radiant heat directed toward the edges in the direction of the plane of the material has already been employed. The essential idea of the invention resides in the use of radiant heat directed at right angles to the plane of the material for making seam welds disposed within the web. This results in important advantages over the previously usual contact process. The temperature of the radiant body need not be maintained within narrow limits. The radiant body cannot be soiled by the plastic owing to the spacing. There is no detrimental insulating layer between the radiant body and the plastic. The absence of an insulating layer and the free selection of the temperature of the radiant body result in a much shorter welding time than is required for the known contact process.

The layers of material may be spaced apart during the supply of heat and brought together before pressure is applied. Alternatively, the layers of material may be superimposed in known manner during the supply of heat. If the layers of material are held, in a development of the invention, in such a manner during the supply of heat that they are freely movable transversely to the direction of the seam weld, the latter will be able to shrink freely so that a seam having an optimum strength can be achieved.

An apparatus for carrying out the process according to the invention is characterized in that an elongated heating element extending parallel to the feed direction is disposed between two similarly directed, preferably coolable spacers, the heating element is set back from the active surfaces of the spacers, the heating element and the spacers are secured to the machine frame by carriers which extend transversely to the feed direction, and at least one pressing roll forcing the webs of material together is disposed behind the spacers in the feed direction. According to the invention, the effective length of the carriers may be adjustable so that the seam can be produced at any desired point in the transverse direction of the tube web. The heating element may suitably consist of a resistance wire, which is provided with a preferably electroplated coating of increased conductivity, except in the heating region, in order to avoid a temperature rise of the heating element in its portions extending through the carriers and those connected to the supply line. The spacers may consist of steel tubes, which are flown through by a coolant and have an enamel coating, which constitutes an effective insulation against the heating element.

An apparatus according to the invention for carrying out the process with intermittently moved webs of material is characterized by at least one gripping jaw, which is movable against the superimposed layers of material and which has in its active surface a groove, which accommodates a heating element in a recessed position, said jaw co-acting with an abutment which is provided on the other side of the layers of material. The webs of material are held by the gripping jaw and the abutment without being contacted by the welding element. The groove causes the welding heat to be directed only to the region in which the seam weld is to be formed. That face of the gripping jaw which confronts the webs of material may be somewhat set back from the gripping face on one side of the groove so that the webs of material are not firmly gripped on this side and are able to shrink. It is also suitable for the clamping jaw to comprise a carrying body which is flown through by a coolant. The abutment may also consist of a gripping jaw, which means that it has a heating element which is accommodated in a recessed position in a groove. Alternatively, the abutment may be stationary and provided with a heat-resisting, resilient layer, preferably of silicone rubber.

For the continuous manufacture of bags which are closed at one end, the gripping jaw may have a cut-off knife and the abutment may have a co-acting cutting edge. To exert the consolidating pressure, a pair of pressing rolls, which are preferably flown through by a coolant, may be disposed behind the gripping jaw in the feed direction. In the continuous manufacture of bags or sacks which are closed at one end it is suitable to provide according to the invention a pressing roll which is movable at right angles to the plane of the material and a feeding device, which is disposed behind the pressure rollers in the feed direction and moves at a higher speed than another feeding device disposed before the gripping jaw. The rear feeding device may consist of a pair of conveyor belts, one of which can be lifted from the other, and the shaft of one reversing pulley of this conveyor belt is guidedly movable along an arc of a circle about the shaft of the other reversing pulley so that the lifting device is much simpler than one in which both reversing pulleys are lifted at the same time.

Further features of the invention are explained in the following description with reference to the drawing, in which FIG. 1 is a sectional view taken on line I—I of FIG. 2 and showing an apparatus according to the invention for making a longitudinal tube seam.

FIG. 2 is a top plan view showing the machine of FIG. 1.

FIG. 3 is a sectional view taken on line III—III of FIG. 2.

FIG. 4 is a sectional view showing an apparatus according to the invention for making a transverse seam.

FIG. 5 shows a detail of a modification of the apparatus according to FIG. 4 in another operating position.

In the apparatus according to FIGS. 1 to 3, a web 4 of weldable plastic material is folded in a manner known per se about a tube former 3. The web edges 1 and 2 of this web are to be joined by a longitudinal tube seam. As is shown particularly in FIG. 3, these edges are separated by two elongated bodies 6 and 7, which are, e.g., rectangular in cross-section and define between themselves a space 5. The bodies 6 and 7 have cavities 8 and 9, through which a coolant flows. An electrically heatable resistance wire 10 is disposed in the space 5 and spaced from the upper and lower web edges 1, 2. This wire is heated to a high temperature and causes the softening of the web portions overlapping the space 5. The shrinkage which results causes the formation of two beads 11 and 12.

As is apparent from FIGS. 1 and 2, the heating wire 10 has such a length in the direction of travel of the web that the weld beads 11 and 12 can be formed at the desired speed of the web. After leaving the heating device, the web edges are caused to approach each other, and the weld beads 11 and 12 are moved into welding contact with each other by means of a pressing roll 13 so that the longitudinal tube seam 14 is formed.

A small roller 3 co-acting with the pressure roll 13 may be rotatably mounted in the tube former 3 for reducing the friction between the tube former and the layers of material. This is known per se and not shown.

The heating device is secured at each end to a bracket 15 or 16, which is fixed to the machine frame. To enable the making of the seam at any desired point in the transverse direction of the tube web, the brackets 15, 16 may be moved forwardly toward the tube to be formed and rearwardly. This is known per se and not shown. The cooled spacers 6 and 7 are held between the carriers 15 and 16. The heating wire 10 extends through bores 17 and 18 in the carriers 15, 16 and is held by insulating pieces 19, 20 secured to the carriers 15, 16. By means which are not shown, the heating wire 10 is yieldingly tensioned to ensure that it will remain taut after a thermal expansion. In order to ensure that the temperature rise of the heating wire will be in the desired region and will not affect the fixed ends extending through the bores 17, 18, these ends are provided with a coating having a higher conductivity e.g., of copper for instance, by electroplating, so that the resistance and temperature rise of these portions is reduced.

The spacers 6, 7 consist, e.g., of steel tubing which has an enamel coating for insulation from the heating wire 10. Coolant is supplied by pipes 21, 22 to these bodies and is discharged by pipes 23, 24.

The most important feature of the transverse welding apparatus shown in FIGS. 4 and 5 consists of a heating wire 35, 36 or 37, which is spaced from the gripping face of both co-acting gripping jaws 31, 32 (FIG. 4) or from one gripping jaw of two co-acting gripping jaws 33, 34 (FIG. 5). The gripping jaws provided with heating wires consist, e.g., of steel, which is provided with an enamel coating for electrical insulation. Each of the heating wires 35 to 37 is accommodated in a groove, such as 38. In order to enable the seam weld to shrink, the gripping jaw 31, 33 having a heating wire has a face 39 which confronts the workpiece and is somewhat set back adjacent to that portion of the workpiece which precedes the welding area. This portion is much shorter than the trailing portion. As a result, the plastic layers to be welded are not gripped on one side of the welding area and can yield while shrinking. The gripping jaws have cavities such as 40, which are flown through by a coolant. The gripping jaws 31 to 33 provided with heating wires are movable in the direction of the arrows 41 to 43 and in the opposite direction.

In the embodiment shown in FIG. 5, which comprises only one heating wire 37 disposed in the upper gripping jaw 33, the lower gripping jaw 34 is stationary and has a heat-resisting, resilient covering 44 consisting, e.g., of silicone rubber.

For the continuous manufacture of bags which are closed at one end from plastic tubing 47, which is intermittently fed by the feeding rolls 45, 46, a knife 50 secured by an adapter 49 to the upper gripping jaw 31, 33 coacts with a knife 48 carried by the lower retaining jaw 32, 34.

The welding station is succeeded by a pressing and cooling station, which consists of an upper roll 51 and a lower roll 52. Preferably the upper roll 51 of the rolls 51 and 52 can be moved into and out of engagement in the direction of the arrow 53 and in the opposite direction. The rolls 51 and 52 rotate preferably continuously at the same peripheral speed as the feed rolls 45, 46. For cooling, the rolls 51, 52 consist of tubes, which are flown through by a coolant. The lifting of the e.g., upper roll 51 is effected by a pneumatic or hydraulic action on its bearings. To enable the engaging and disengaging movement of the roll, the drive is transmitted to this roll by means of a universal joint shaft. The control of the engaging and disengaging movements will be described in conjunction with the conveyor which succeeds the pressing and cooling station. This conveyor consists of upper and lower conveyor belts 54, 55 and corresponding reversing pulleys 56, 57 at the receiving end and reversing pulleys, not shown at the other end. The conveyor belts 54 and 55 move at a higher speed than the rolls 45, 46 and 51, 52. In order to prevent the succeeding conveyor from exerting an inadmissible tension on the tube web during the feeding of the plastic tube web at the speed determined by the rolls 45, 46, 51, 52 and during the ensuring stand-still period, the reversing pulleys, such as 56, for the upper conveyor belt 54 can be moved into and out of engagement in the direction of the arrow 58. They are moved into engagement as soon as the knife 50 has cut through the tube web so that a finished bag 59 has been severed, which is then moved to the discharge at the higher speed of the belts 54, 55. The reversing pulley 56 is lifted on an arc of a circle which is indicated by the arrow 58 and the center of which lies in the other reversing pulley, which is not shown. As a result, this other reversing pulley is not lifted, and need not be, because it is disposed beyond the front edge even of the longest bag to be made. The pivotal movement of the pulley 56 about the center of the other pulley causes the conveyor belt to be always taut. This lifting device is simpler than one in which both pulleys are moved up and down parallel to each other.

When the upper conveyor belt 54 is engaged with the lower conveyor belt 55 for discharging a finished bag at the higher speed of these belts, as is shown, the disengageable pressing and cooling roll 51 is disengaged, as is also shown, in order to prevent an obstruction of the discharge at the higher speed.

The apparatus operates as follows: When the conveyor belt 54 is disengaged, the pressure roll 51 is engaged and the upper gripping jaw 31 or 33 has been raised by means, not shown, to such an extent that the space between the lower and upper knives is sufficient for feeding the tube web through between them, the feed rolls 45, 46 feed a plastic tube web 47 toward the pressing and cooling rolls 51, 52. The web 47 may be provided with a transverse weld 60 at its end disposed in the welding apparatus. Between the pressing and cooling rolls 51, 52, the weld 60 is sized and smoothened and is consolidated and cooled at the same time. The front end of the workpiece is then moved by way of a table top, not shown, onto the lower conveyor belt 55. This revolves at a higher speed but cannot exert an inadmissible tension on the workpiece web because there is no pressure applied. This conveying movement is continued until a web portion which corresponds to the length of the bag to be made has entered beyond the severing point between the knives 48, 50. At this time, the feed rolls 45, 46 are stopped and with them the workpiece tube. At the same time or, for the sake of precaution, immediately before, the pressing roll 51 is lifted. The lower pressing roll 52 and the lower conveyor belt 55 continue to move just as the upper pressing roll and the upper belts 54 so that an inadmissible tension is not exerted onto the stationary workpiece web because there is no pressure applied. Immediately after the workpiece web has been stopped, the upper gripping jaw 31 or 33 is lowered. This results initially in the severing cut (see FIG. 5). The upper conveyor belt 54 is now lowered and the discharge of the finished bag 59 begins. In the meantime, the upper gripping jaw 31 or 33 has assumed the position of FIG. 4 and the welding operation is performed. Owing to the shrinking of the plastic material, a beadlike transverse seam weld 60 is formed. The workpiece end beyond the seam weld can follow up without obstruction because the jaw face 39 does not grip. When the welding has been performed, the upper gripping jaw 31 or 33 is raised back to its initial position, the feed rolls 45, 46 are started again, the upper pressing and cooling roll 51 is lowered and the upper conveyor belt 54 is raised so that the cycle described hereinbefore is repeated.

What is claimed is:

1. A process of welding layers of thermoplastic material which extend toward both sides from the seam weld, particularly for forming longitudinal and transverse seams in the manufacture of sacks and bags from plastic, the process comprising heating the layers of material to a temperature above their melting point by radiant heat supplied at right angles to the plane of the material in the region in which the seam weld is to be formed, and subjecting the superimposed layers to a consolidating pressure in this region.

2. A process as set forth in claim 1, wherein the layers of material are spaced apart during the supply of heat and are brought together before pressure is applied.

3. A process as set forth in claim 1, wherein the layers of material are superimposed during the supply of heat.

4. A process as set forth in claim 1, wherein the layers of material are held in such a manner during the supply of heat that they are freely movable transversely to the direction of the seam weld.

5. An apparatus for welding thermoplastic layers along a seam comprising a machine frame, a pair of elongated spacers parallel with the feed direction and an elongated heating element being similarly directed and disposed between said spacers, said heating element being set back from the active surfaces of the spacers so that the heating element radiates heat to the thermoplastic layers at generally right angles thereto without engaging the same, carries extending transverse to the feed direction securing the spacers and heating elements to the machine frame, and at least one pressing roll means located behind the spacers in the feed direction for forcing the layers together.

6. Apparatus as set forth in claim 5, wherein the effective length of the carriers is adjustable.

7. Apparatus as set forth in claim 5, wherein the heating element consists of a resistance wire provided with an electroplated coating of increased conductivity outside the heating region.

8. Apparatus as set forth in claim 5, wherein the spacers comprise steel tubes adapted to convey a coolant and provided with an enamel coating.

9. An apparatus for welding layers of thermoplastic material comprising means for superimposing the material layers, heating means for heating the layers when superimposed to a temperature above their melting points by radiating heat to the material plane at a generally right angle direction thereto, pressure means for subjecting the superimposed heated zones of said layers to a consolidating pressure, and means coupled to the heating means for intermittently moving the layers of material comprising at least one gripping jaw movable against the superimposed layers of material, said jaw having an active surface defining a groove, said heating means including a heating element accommodated in said groove so as to be recessed from the active surface of said jaw, and an abutment disposed opposite the layers from the jaw to co-act therewith.

10. Apparatus as set forth in claim 9, wherein the gripping jaw includes a face which confronts the layers of material, said face being set back from the gripping surface on one side of the groove.

11. Apparatus as set forth in claim 9, wherein the gripping jaw has a carrying body adapted to convey a coolant.

12. Apparatus as set forth in claim 9, wherein the abutment includes a gripping jaw according to said first mentioned gripping jaw.

13. Apparatus as set forth in claim 9, wherein the abutment is stationary and is provided with a heat-resisting, resilient layer.

14. Apparatus as set forth in claim 9, wherein the gripping jaw includes a cut-off knife and the abutment includes a co-acting cutting edge.

15. Apparatus as set forth in claim 9, wherein a pair of pressing rolls are disposed behind the gripping jaw in the feed direction.

16. Apparatus as set forth in claim 15, wherein one pressing roll is movable at right angles to the plane of the material and a feeding device, being disposed behind the pressing rolls in the feed direction and another feeding device disposed before the gripping jaw for feeding the layers of material, said first mentioned device running at a higher feeding speed than said second mentioned device.

17. Apparatus as set forth in claim 16, wherein the first mentioned feeding device includes a pair of conveyor belts and one of the conveyor belts is adapted to be lifted away from the other, said first-mentioned feeding device including a pair of reversing pulleys, and means guiding the axis of one reversing pulley for movement along an arc of a circle about the axis of the other reversing pulley.

References Cited

UNITED STATES PATENTS

| | | | |
|---|---|---|---|
| 3,247,041 | 4/1966 | Henderson | 156—272 |
| 3,281,303 | 10/1966 | Seefluth | 156—282 |
| 2,570,921 | 10/1951 | Collins | 156—274 X |
| 2,706,165 | 4/1955 | Korsgaard | 156—274 |
| 2,794,485 | 6/1957 | Ashton et al. | 156—282 X |
| 3,016,085 | 1/1962 | Gassner | 156—359 |
| 3,075,868 | 1/1963 | Long | 156—82 |
| 3,272,674 | 9/1966 | Sachs et al. | 156—282 |

FOREIGN PATENTS 1,248,473   11/1960   France.

EARL M. BERGERT, *Primary Examiner.*

M. L. KATZ, *Assistant Examiner.*